United States Patent
Reznar et al.

(10) Patent No.: US 8,424,170 B2
(45) Date of Patent: Apr. 23, 2013

(54) PLASTIC HINGED TRIM CLIP

(75) Inventors: Jason Reznar, Redford, MI (US); Jeff Cornell, Grosse Pointe Park, MI (US)

(73) Assignee: Tinnerman Palnut Engineered Products, Inc., Brunswick, OH (US)

( * ) Notice: Subject to any disclaimer, the term of this patent is extended or adjusted under 35 U.S.C. 154(b) by 770 days.

(21) Appl. No.: 12/609,269

(22) Filed: Oct. 30, 2009

(65) Prior Publication Data

US 2010/0107376 A1 May 6, 2010

Related U.S. Application Data

(60) Provisional application No. 61/197,733, filed on Oct. 30, 2008.

(51) Int. Cl.
*F16B 5/06* (2006.01)
*F16B 5/12* (2006.01)

(52) U.S. Cl.
USPC .......................................... 24/297; 24/581.11

(58) Field of Classification Search ............... 24/297, 24/581.11, 487, 518, 528
See application file for complete search history.

(56) References Cited

U.S. PATENT DOCUMENTS

| | | | | | |
|---|---|---|---|---|---|
| 3,809,371 | A | * | 5/1974 | Martini | 24/543 |
| 4,438,552 | A | * | 3/1984 | Omata | 24/297 |
| 4,835,824 | A | * | 6/1989 | Durham et al. | 24/543 |
| 5,022,126 | A | * | 6/1991 | Davis | 24/543 |
| 5,313,721 | A | * | 5/1994 | Filden | 24/458 |
| 6,279,207 | B1 | | 8/2001 | Vassiliou | |

* cited by examiner

*Primary Examiner* — Robert J Sandy
(74) *Attorney, Agent, or Firm* — McDonald Hopkins LLC

(57) ABSTRACT

A plastic hinged trim clip is described. The trim clip may secure two or more components together. The trim clip may include a body and a locking feature. The body may include a first end and a second end located on either side of a fold area. The locking feature may include a first hook located on the first end, and a second hook and first opening located on the second end. The first hook may engage with the second hook and the first opening. The locking feature may engage around one of the components. Each end may include an insertion portion to engage with another component. The locking feature may also include a third hook and a second opening that may engage with one another. The locking feature may increase the ratio of insertion to retention within the components to be greater than 1:2 or 1:3.

20 Claims, 3 Drawing Sheets

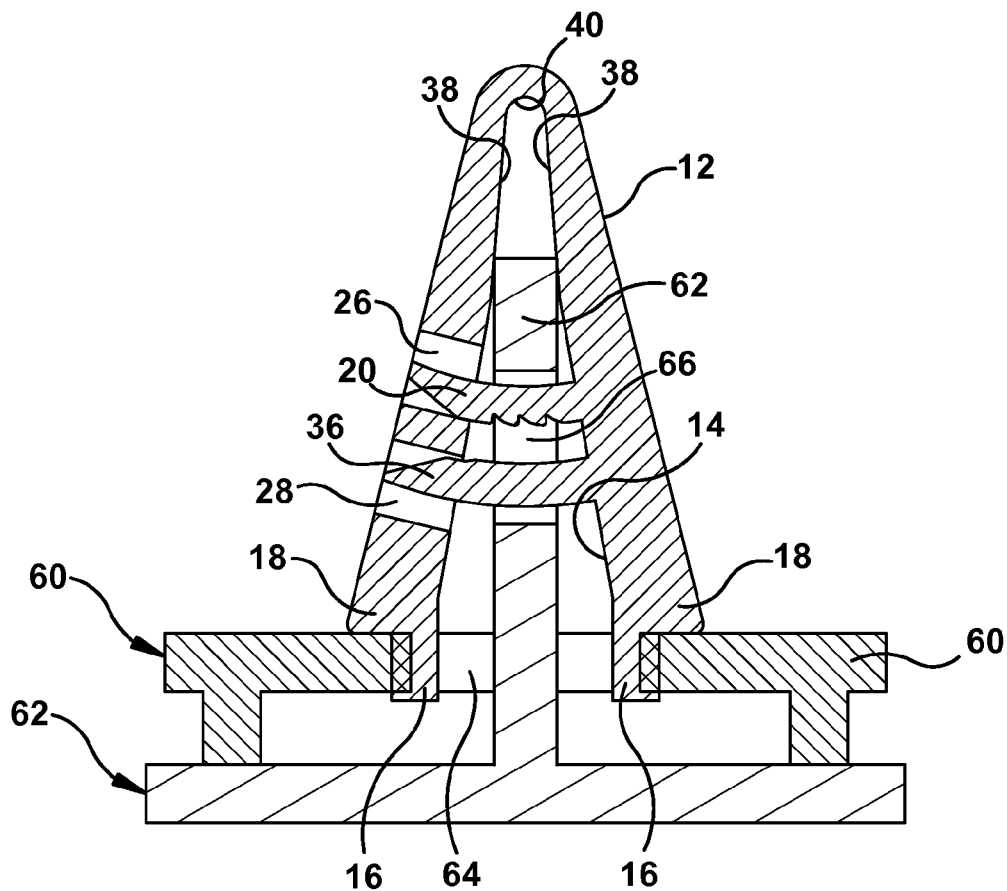
FIG. 6
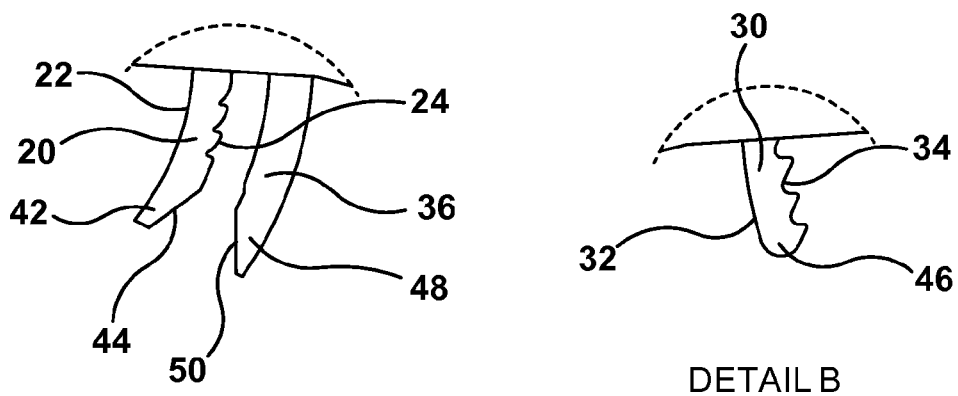
DETAIL A
FIG. 4
DETAIL B
FIG. 5

PLASTIC HINGED TRIM CLIP

CROSS-REFERENCE TO RELATED APPLICATION

This application claims benefit from U.S. Provisional Patent Application No. 61/197,733, entitled "Plastic Hinged Trim Clip," filed on Oct. 30, 2008, which is hereby incorporated in its entirety by reference.

FIELD OF INVENTION

The present invention generally relates to fasteners and, more particularly, to a clip for securing one or more components together.

BACKGROUND

It is well known to utilize fasteners, such as trim clips, for securing a variety of different types of components together. During the installation, it may be necessary to secure two or more of these components together. Many difficulties may be encountered during the manufacture and assembly of components. For example, various components of products may require numerous and different types of tools in order to assemble the components together. As a result, the use of these numerous tools may be time consuming and costly for manufacturers.

Moreover, the installation of some components may be difficult due to limited access, such as access on only one side of the components. Furthermore, it may frequently be desirable to provide consumers with access to a fastener that may secure the components. For example, a consumer may need access to be able to repair the components, repair the fastener, exchange the components, clean the components, or for other similar reasons. In order to improve efficiency during manufacture, improved fastening devices are needed. In addition, typical trim clip applications have a 1:1 ratio of insertion into the panel opening, versus retention into the panel opening.

Therefore, there is a need in the art to provide an improved and easy to use trim clip that may be attachable to a component without the use of a tool, be installed quickly to reduce manufacturing time and expense, as well as have the ability to be used in a variety of applications. There is also a need to provide a trim clip having a retention force that is significantly increased.

SUMMARY

A plastic hinged trim clip is described. The trim clip may secure two or more components together, such as a blade and a panel. The trim clip may include a body and a locking feature. The body may include a first end and a second end located on either side of a fold area, wherein either side of the fold area is capable of engagement with the blade. The locking feature may include a first hook located on the first end, and a second hook and a first opening located on the second end. The first hook is capable of engagement with the second hook and the first opening. The locking feature is capable of engagement around the blade. Each end may include an insertion portion capable of engagement with the panel. The locking feature may also include a third hook and a second opening that may be capable of engagement with one another. The locking feature may increase the ratio of insertion to retention within the panel to be greater than 1:2 or 1:3.

DESCRIPTION OF THE DRAWINGS

Objects and advantages together with the operation of the invention may be better understood by reference to the following detailed description taken in connection with the following illustrations, wherein:

FIG. 4 illustrates a detailed view of Detail A of a first hook and a third hook of the trim clip of FIG. 2.

FIG. 5 illustrates a detailed view of Detail B of a second hook of the trim clip of FIG. 2.

FIG. 6 illustrates a sectional side view of the trim clip in an assembled position.

DETAILED DESCRIPTION

Figure 1:
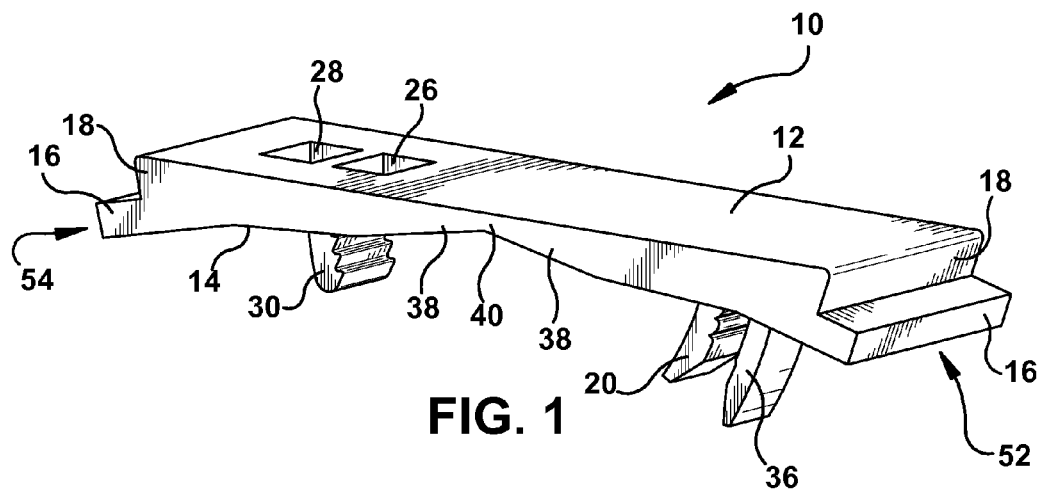
FIG. 1 illustrates a perspective view of a plastic hinged trim clip in an embodiment of the invention.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

A plastic hinged trim clip 10 is illustrated in FIGS. 1-8. The trim clip 10 may be attachable to one or more components without the use of tools, be installed quickly to reduce manufacturing time and expense, as well as have the ability to be used in a variety of applications, such as in an automotive setting for interior trim components. For example, the trim clip 10 may be utilized for fastening an A-pillar cover to body sheet metal. The plastic hinged trim clip 10 may provide a mechanical locking feature that may lock both sides of the clip 10 through a blade feature 62, for example. This locking feature may cause the blade 62 to be the failure mode during a retention test and subsequently increase the ratio of insertion to retention within the panel 60 and slot 66 to be greater than 1:2 or 1:3.

The plastic hinged trim clip 10 may be of any appropriate shape and size, such as a generally rectangular shape and approximately 31.5 mm long by approximately 12 mm wide. The trim clip 10 may also be constructed from a variety of any appropriate material. For example, the trim clip 10 may be constructed out of a plastic material, such as nylon.

Figure 2:
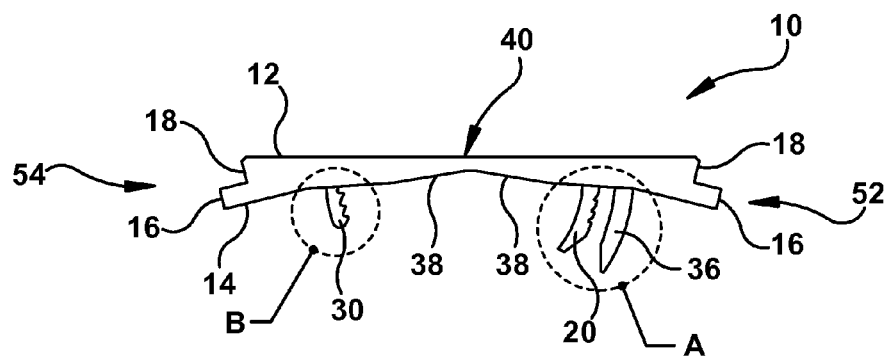
FIG. 2 illustrates a side view of the trim clip.
Figure 3:
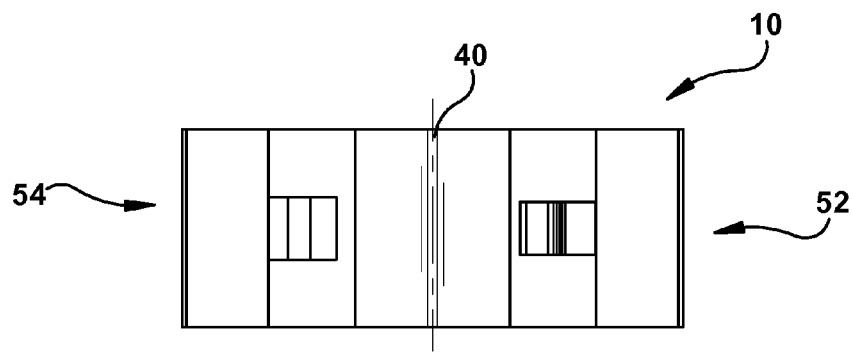
FIG. 3 illustrates a bottom view of the trim clip.

The plastic hinged trim clip 10 may include a top side 12, a bottom side 14, and at least one inserted portion 16 (FIGS. 1 and 2). The trim clip 10 may also include first end 52, a second end 54 and a bend or fold area 40. The fold area 40 may be located at any appropriate position on the trim clip 10, such as at the approximate center of the trim clip 10 and between the first end 52 and the second end 54 (FIG. 3).

The trim clip 10 may also include at least one stepped portion 18. While the trim clip 10 may be shown and described as having one fold area 40, two inserted portion 16 and two stepped portion 18, it is to be understood that the trim clip 10 may have any appropriate number of folds 40, inserted portions 16, and stepped portions 18, and should not be limited to that shown and described herein.

The inserted portions 16 may be located at any appropriate position on the trim clip 10, such as at either end of the trim clip 10 and towards the bottom side 14. The inserted portions 16 may be of any appropriate shape, such as a generally ovular, triangular or rectangular shape. While the inserted portions 16 are shown as being one long section, it is to be understood that there may be numerous smaller inserted portions 16 instead and should not be limited to that shown and described herein.

The stepped portions 18 may be located at any appropriate position on the trim clip 10, such as adjacent the inserted portions 16. The stepped portions 18 may be located at either end of the trim clip 10 towards the top side 12, and may be tabbed slightly inward toward the fold area 40 thereby creating a flat face or a step. While the stepped portions 18 are shown as being one long section, it is to be understood that there may be numerous smaller stepped portions 18 instead and should not be limited to that shown and described herein. The stepped portions 18 may provide one or more faces for the trim clip 10 to rest on or abut a component, such as the panel 60, when in use (see FIGS. 6 and 7).

The top side 12 may include a first opening 26 and a second opening 28. The first opening 26 and second opening 28 may be located at any appropriate position on the trim clip 10, such as near the approximate center of the second end 54. While the trim clip 10 is shown and described as having two openings 26, 28, it is to be understood that there may be any appropriate number of openings, such as one, two, three, four, etc., and should not be limited to that shown and described herein.

The first opening 26 and second opening 28 may be of any appropriate shape and size, such as a generally circular, rectangular or square shape. The first opening 26 and second opening 28 may be of the exact same size and shape or may be of differing sizes and shapes. For example, the first opening 26 and second opening 28 may be of a substantially similar size and shape. The first opening 26 and second opening 28 may be generally of a size large enough to fit a first hook 20 and a third hook 36 (FIG. 6).

The bottom side 14 of the trim clip 10 may include a first hook 20, a second hook 30, and a third hook 36 (FIGS. 1 and 2). The hooks 20, 30, 36 may be located at any appropriate position on the trim clip 10. For example, the first hook 20 and third hook 36 may be located on the first end 52, such as near the approximate center of the first end 52. The second hook 30 may be located on the second end 54, such as near the approximate center of the second end 54. In addition, the second hook 30 may be located between the first opening 26 and the second opening 28. While the trim clip 10 is shown and described as having three hooks 20, 30, 36, it is to be understood that there may be any appropriate number of hooks, such as one, two, three, four, etc., and should not be limited to that shown and described herein.

Figure 8:
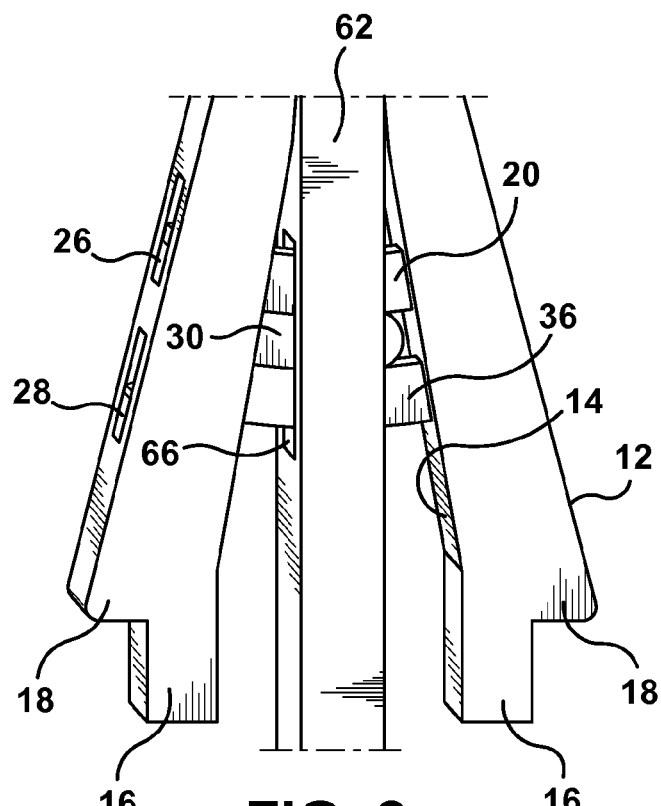
FIG. 8 illustrates a close up perspective view of the trim clip in an assembled position.

The hooks 20, 30, 36 may be of any appropriate shape and size, such as a generally curved, rectangular or pointed. The hooks 20, 30, 36 may all be of the exact same size and shape or may be of differing sizes and shapes. For example, the first hook 20 and the third hook 36 may be of a substantially similar size and shape. The first hook 20 and the third hook 36 may be generally shaped and size to fit the second hook 30 there between (FIG. 8).

Detailed views of the first hook 20, second hook 30 and third hook 36 are illustrated in FIGS. 4 and 5. The first hook 20 may be of any appropriate shape and size, such as a generally curved shape, curving in towards the fold area 40. The first hook 20 may also include a smooth side 22 and a serrated side 24. The smooth side 22 may be located towards the fold area 40 and the serrated side 24 may be located towards the first end 52 and away from the fold area 40. The first hook 20 may also include a generally pointed end 42 with a taper 44. The taper 44 may be located toward the first end 52 of the trim clip 10. The taper 44 may help aid in alignment and guide the first hook 20 into the first opening 26 (FIG. 6).

The second hook 30 may be of any appropriate shape and size, such as a generally curved shape, curving in towards the fold area 40. The second hook 30 may be preferably located between the first opening 26 and the second opening 28. The second hook 30 may include a smooth side 32 and a serrated side 34. The smooth side 32 may be located towards the second end 52 and away from the fold area 40. The serrated side 34 may be located towards the fold area 40. The serrated side 34 of the second hook 30 may be correspondingly shaped and sized to engage with the serrated side 24 of the first hook 20 so that the first hook 20 and the second hook 30 may securely engage one another, for example. The second hook 30 may also include a generally rounded end 46.

The third hook 36 may be of any appropriate shape and size, but is preferably of a generally curved shape, curving in towards the fold area 40. The third hook 36 may include two smooth sides. The first hook 20 and the third hook 36 may be generally be located substantially parallel to one another (FIG. 4). The third hook 36 may include a generally pointed end 48. The pointed end 48 may include a taper 50. The taper 50 may help aid in alignment and guide the third hook 36 into the second opening 28 (FIG. 6). The taper 50 of the third hook 36 may be located toward the second end 54 of the trim clip, so that the taper 44 of the first hook 20 and the taper 50 of the third hook 36 generally face towards one another (FIG. 4).

The bottom side 14 may also include at least one tapered portion 38. While the trim clip 10 is shown and described as having two tapered portions 38, it is to be understood that there may be any appropriate number of tapered portions 38 and should not be limited to that described herein. The tapered portions 38 may be positioned at any appropriate location on the trim clip 10, such as being located on either side of the fold area 40. The tapered portions 38 may aid the user in folding the clip 10 at the fold area 40.

Figure 7:
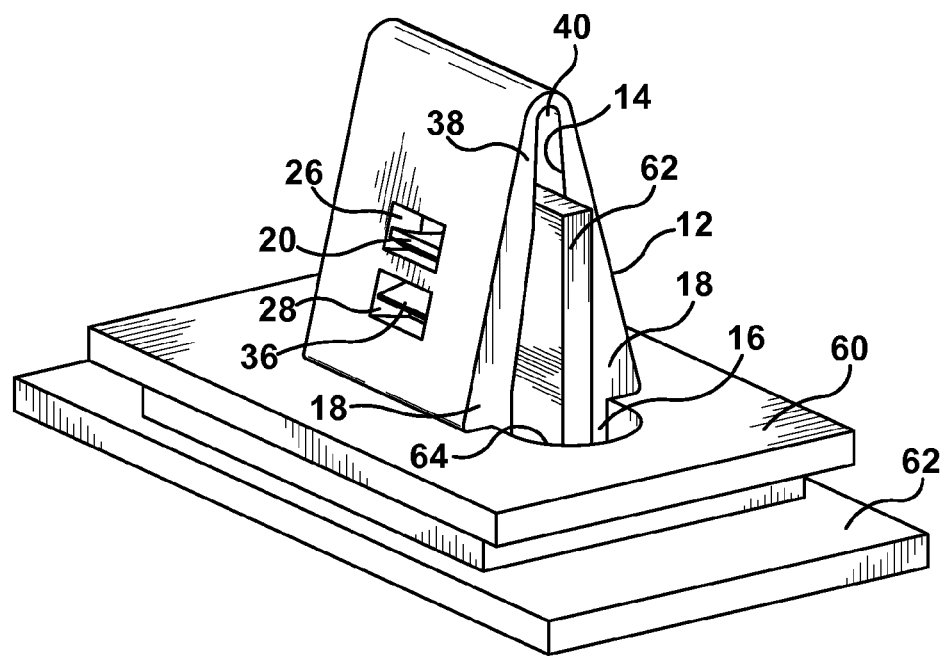
FIG. 7 illustrates a perspective view of the trim clip in an assembled position.

FIGS. 6, 7, and 8 illustrate the plastic hinged trim clip 10 in a typical folded and assembled position. When assembled, the trim clip 10 may be folded near the fold area 40 so that the trim clip 10 may be folded onto and around a blade 62. The blade 62 may include a slot 66 through which the first hook 20, second hook 30 and third hook 36 may be inserted. The blade 62 may be any type of appropriate or desired member to be secured to another component, such as a panel 60. The panel 60 may also be any type of appropriate or desired member to be secured.

The first hook 20 and third hook 36 may enter through one side of the slot 66, and the second hook 30 may enter through the opposite side of the slot 66. The hooks 20, 30, 36 may meet in the approximate center of the slot 66, whereby the serrated side 34 of the second hook 30 may engage with the serrated side 24 of the first hook 20. This engagement may lock the hooks 20, 30 and thereby the sides 52, 54 of the trim clip 10 together (FIG. 8). The third hook 36 may provide support to the smooth side 32 of the second hook 30 during the locking and engagement process.

Once the hooks 20, 30 have become locked together, the pointed end 42 of the first hook 20 may continue to move through the first opening 26 and the pointed end 48 of the third hook 36 may continue to move through the second opening 28 (FIG. 6). The movement by the first hook 20 through the first opening 26 may be aided by the taper 44 on the first hook 20. The movement by the third hook 36 through the second opening 28 may be aided by the taper 50 on the third hook 36. Moreover, the trim clip 10 may provide for easy installation onto the blade 62 via manual installation, such as by hand. As an alternative, installation of the trim clip 10 onto the blade 62 may be accomplished by any appropriate means, such as by being automated by using a hand installation tool.

As the trim clip 10 is folded to lock both of its sides 52, 54 together through the slot 66 in the blade 62, the inserted portions 16 may be inserted into a panel opening 64 located in the panel 60 (FIGS. 6 and 7). There may be a poke-yoke feature of compression of the clip 10 through the panel opening 64 that may ensure proper installation onto the blade 62. As the inserted portions 16 reach the desired insertion point, the trim clip 10 may be stopped by the stepped portions 18, which may abut or rest on top of the panel 60.

Typical trim clip applications may often have a 1:1 ratio of insertion into the panel opening 64 versus retention in the panel opening 64. The plastic hinged trim clip 10 addresses this issue by mechanically locking the trim clip 10 through the blade 62, as discussed above. The plastic hinged clip 10 may have a mechanical locking feature via the hooks 20, 30, 36 and openings 26, 28 that may lock both sides 52, 54 of the clip 10 through the blade 62 feature. This locking feature may cause the blade 62 to be the failure mode during a retention test and subsequently increases the ratio of insertion to retention within the panel 60 and slot 66 to be greater than 1:2 or 1:3.

The hinged design of the trim clip 10 may allow for easy installation through the blade 62. The trim clip 10 may also provide for a retention failure mode as a result of the plastic blade 62 strength. In addition, the retention force is significantly increased over other typical trim clip applications.

The embodiments of the invention have been described above and, obviously, modifications and alternations will occur to others upon reading and understanding this specification. The claims as follows are intended to include all modifications and alterations insofar as they come within the scope of the claims or the equivalent thereof.

Having thus described the invention, we claim:

1. A trim clip for securing at least two components together, said trim clip comprising:
    a body including a first end and a second end located on either side of a fold area, wherein either side of said fold area is capable of engagement with a first component;
    a first hook located on said first end, wherein said first hook includes a serrated side;
    a second hook and an aperture in said body located on said second end, wherein said second hook includes a serrated side;
    wherein said first hook engages said second hook and said aperture upon folding of said body;
    wherein said serrated side of said first hook is capable of engagement with said serrated side of said second hook; and
    wherein each end includes an insertion portion capable of engagement with a second component.

2. The trim clip of claim 1 further comprising a third hook located on said first end.

3. The trim clip of claim 2 further comprising a second aperture in said body located on said second end.

4. The trim clip of claim 3, wherein said third hook engages with said second aperture upon folding of said body.

5. The trim clip of claim 3, wherein said aperture and said second aperture are located on either side of said second hook.

6. The trim clip of claim 2, wherein said first hook and said third hook are located on either side of said second hook when engaged.

7. The trim clip of claim 1, wherein each end further includes a stepped portion located adjacent said insertion portion.

8. The trim clip of claim 1, wherein each side includes a tapered portion located adjacent said fold area.

9. A trim clip for securing a blade to a panel, said trim clip comprising:
    a body including a first end and a second end located on either side of a fold area, wherein either side of said fold area is capable of engagement with the blade;
    a locking feature comprising:
        a first hook located on said first end, wherein said first hook includes a serrated side;
        a second hook and an aperture in said body located on said second end, wherein said second hook includes a serrated side;
        wherein said first hook engages said second hook and said aperture upon folding of said body;
        wherein said serrated side of said first hook is capable of engagement with said serrated side of said second hook;
        wherein said locking feature is capable of engagement around the blade; and
    wherein each end includes an insertion portion capable of engagement with the panel.

10. The trim clip of claim 9, wherein said locking feature includes a third hook located on said first end.

11. The trim clip of claim 10, wherein said locking feature includes a second aperture in said body located located on said second end.

12. The trim clip of claim 11, wherein said third hook is capable of engagement with said second aperture.

13. The trim clip of claim 12, wherein said locking feature increases the ratio of insertion to retention within the panel to be greater than 1:2.

14. The trim clip of claim 12, wherein said locking feature increases the ratio of insertion to retention within the panel to be greater than 1:3.

15. The trim clip of claim 9, wherein each end further includes a stepped portion located adjacent said insertion portion.

16. The trim clip of claim 15, wherein said stepped portions are capable of abutted engagement with the panel.

17. A trim clip comprising:
    a body having a fold and first and second ends located generally between said fold;
    an aperture in said body positioned on said second end;
    a first engaging member located on said first end, said first engaging member having a first locking element;
    a second engaging member located on said second end, said second engaging member having a second locking element; and
    wherein said first engaging member engages with said second engaging member and said aperture upon folding of said body and wherein said first locking element engages said second locking member upon engagement of said first and second engaging members.

18. The trim clip of claim 17, wherein the first engaging member includes a hook member and the first locking element includes a serrated side.

19. The trim clip of claim 18, wherein the second engaging member includes a hook member and the second locking element includes a serrated side.

20. The trim clip of claim 17, wherein said first and second sides each include a tapered portion located adjacent said fold.

\* \* \* \* \*